United States Patent
Zhou et al.

(10) Patent No.: US 11,823,617 B2
(45) Date of Patent: Nov. 21, 2023

(54) CHARGE PUMP CONTROL CIRCUIT, DISPLAY PANEL AND DISPLAY DEVICE

(71) Applicants: MIANYANG HKC OPTOELECTRONICS TECHNOLOGY CO., LTD., Mianyang (CN); HKC CORPORATION LIMITED, Shenzhen (CN)

(72) Inventors: Renjie Zhou, Mianyang (CN); Rongrong Li, Mianyang (CN)

(73) Assignees: MIANYANG HKC OPTOELECTRONICS TECHNOLOGY CO., LTD., Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/147,196

(22) Filed: Dec. 28, 2022

(65) Prior Publication Data

US 2023/0343275 A1    Oct. 26, 2023

(30) Foreign Application Priority Data

Apr. 24, 2022  (CN) .......................... 202210434013.4

(51) Int. Cl.
*G09G 3/32* (2016.01)
*H02M 3/07* (2006.01)
(Continued)

(52) U.S. Cl.
CPC ................ *G09G 3/32* (2013.01); *H02M 3/07* (2013.01); *H05B 45/325* (2020.01);
(Continued)

(58) Field of Classification Search
CPC .......... G09G 3/32; G09G 3/3406; G09G 3/34; G09G 2330/021; H05B 45/325
See application file for complete search history.

(56) References Cited

U.S. PATENT DOCUMENTS

| 2006/0033483 | A1 | 2/2006 | Wu | |
|---|---|---|---|---|
| 2009/0015178 | A1* | 1/2009 | Liu | H05B 45/3725 315/297 |
| 2011/0273104 | A1* | 11/2011 | Uchimoto | G09G 3/3406 315/210 |

FOREIGN PATENT DOCUMENTS

| CN | 101630906 A | 1/2010 |
|---|---|---|
| CN | 104680975 A | 6/2015 |

(Continued)

OTHER PUBLICATIONS

First Office Action issued in counterpart Chinese Patent Application No. 202210434013.4, dated Nov. 21, 2022.

*Primary Examiner* — Kevin M Nguyen
(74) *Attorney, Agent, or Firm* — Westbridge IP LLC (57) ABSTRACT

Disclosed are a charge pump control circuit, a display panel and a display device. In particular, the charge pump control circuit includes: a first sampling identification module, in particular, a sampling terminal of a first sampling identification module is connected to the series branch circuit, the first sampling identification module is configured to sample the input voltage of the series branch circuit, and in a determination that the series branch circuit is in a heavy load working condition according to the input voltage of the series branch circuit, a first switching signal is output; in a determination that the series branch circuit is in a light load working condition according to the input voltage of the series branch circuit, a second switching signal is output.

10 Claims, 2 Drawing Sheets

(51) Int. Cl.
 *H05B 45/335* (2020.01)
 *H05B 45/3725* (2020.01)
 *H05B 45/325* (2020.01)

(52) U.S. Cl.
 CPC ....... *H05B 45/335* (2020.01); *H05B 45/3725* (2020.01); *G09G 2330/021* (2013.01)

(56) References Cited

FOREIGN PATENT DOCUMENTS

| | | |
|---|---|---|
| CN | 108365742 A | 8/2018 |
| CN | 111934542 A | 11/2020 |
| KR | 20110035443 A | 4/2011 |

* cited by examiner

CHARGE PUMP CONTROL CIRCUIT, DISPLAY PANEL AND DISPLAY DEVICE

CROSS-REFERENCES TO RELATED APPLICATIONS

This application claims priority to Chinese Patent Application No. 202210434013.4, filed on Apr. 24, 2022, the entire contents of which are incorporated herein by reference.

TECHNICAL FIELD

The present application relates to the technical field of mini-light emitting diode (mini-LED) driving, in particular to a charge pump control circuit, a display panel and a display device.

BACKGROUND

At present, since the size of mini-LED is between 50 and 200 μm, it can be used as the backlight of liquid crystal display (LCD) and has broad market prospects in the fields of TV, display screen, notebook and so on. Compared with LCD and organic light emitting diode (OLED) display, the mini-LED has the advantages of high brightness, low power, long life, good thermal stability, etc. However, due to the use of multiple mini-LEDs in series, the display panel has the problem of large power consumption.

SUMMARY

The main purpose of the present application is to provide a charge pump control circuit, which aims to solve the problem of high power consumption of mini-LED display panel.

To realize the purpose above, the present application provides a charge pump control circuit, applied to a display panel, in particular the display panel includes a series branch circuit and a charge pump module, the series branch circuit includes a plurality of mini-LEDs disposed in series groups, the charge pump module is provided with a first switching circuit, an output terminal of the charge pump module is connected to an input terminal of the series branch circuit, and the first switching circuit is configured to adjust an output voltage of the charge pump module;

the charge pump control circuit includes:
a first sampling identification module, a pulse width modulation (PWM) module, and a pulse frequency modulation (PFM) module;
a sampling terminal of the first sampling identification module is connected to the series branch circuit, the first sampling identification module is configured to sample an input voltage of the series branch circuit, and output a first switching signal in a determination that the series branch circuit is in a heavy load working condition according to the input voltage of the series branch circuit, and output a second switching signal in a determination that the series branch circuit is in a light load working condition according to the input voltage of the series branch circuit;
a controlled terminal of the PWM module is connected to an output terminal of the first sampling identification module, an output terminal of the PWM module is connected to a controlled terminal of the first switching circuit, and the PWM module is configured to output a PWM signal to drive the first switching circuit in response that the first switching signal is received; and
a controlled terminal of the PFM module is connected to an output terminal of the first sampling identification module, an output terminal of the PFM module is connected to the controlled terminal of the first switching circuit, and the PFM module is configured to output a PFM signal to drive the first switching circuit to operate in response that the second switching signal is received.

In an embodiment, the first sampling identification module includes: a first voltage sampling circuit and a first comparison circuit;
a sampling terminal of the first voltage sampling circuit is connected to an anode of a first mini-LED in the series branch circuit, and the first voltage sampling circuit is configured to sample the input voltage of the series branch circuit and output the first voltage sampling signal;
a first input terminal of the first comparison circuit is connected to an output terminal of the first voltage sampling circuit, a second input terminal of the first comparison circuit is configured to access a first preset reference voltage, and output the first switching signal or the second switching signal according to a comparison result of the first voltage sampling signal and the first preset reference voltage.

In an embodiment, the PFM module includes: an inverting module and a trigger module;
an input terminal of the inverting module is connected to an output terminal of the first sampling identification module, and the inverting module is configured to invert the second switching signal and output the inverted second switching signal;
a first input terminal of the trigger module is connected to an output terminal of the inverting module, a second input terminal of the trigger module is connected to the output terminal of the first sampling identification module, an output terminal of the trigger module is the output terminal of the PFM module, and the trigger module is configured to generate and output a corresponding PFM signal according to the inverted second switching signal received at the first input terminal in response that the second switching signal is received at the second input terminal.

In an embodiment, the charge pump control circuit further includes: an amplifying module;
a controlled terminal of the amplifying module is connected to the output terminal of the PFM module, an input terminal of the amplifying module is configured to access a gate turn-on voltage, an output terminal of the amplifying module is connected to a controlled terminal of the first switching circuit, and the amplifying module is configured to amplify a signal amplitude of the PFM signal according to the gate turn-on voltage and output to the controlled terminal of the first switching circuit.

In an embodiment, the amplifying module includes:
a first N-type thin film transistor, and a first P-type thin film transistor;
in particular an input terminal of the first N-type thin film transistor is the input terminal of the amplifying module, a controlled terminal of the first N-type thin film transistor and a controlled terminal of the first P-type thin film transistor are interconnected to form the controlled terminal of the amplifying module, an output terminal of the first N-type thin film transistor and the input terminal of the first P-type thin film transistor are interconnected to form the output terminal of the amplifying module, an output terminal of the first P-type thin film transistor is grounded.

In an embodiment, the charge pump control circuit further includes: a second sampling identification module;

a first input terminal of the second sampling identification module is connected to the output terminal of the PWM module, a second input terminal of the second sampling identification module is connected to the output terminal of the PFM module, a sampling terminal of the second sampling identification module is connected to the series branch circuit, a first output terminal and a second output terminal of the second sampling identification module are connected to the controlled terminal of the first switching circuit;

the second sampling identification module is configured to sample the output voltage of the series branch circuit, and output the accessed PWM signal from the first output terminal to the controlled terminal of the first switching circuit in a determination that the series branch circuit is in the heavy load working condition according to the output voltage of the series branch circuit, and output the accessed PFM signal from the second output terminal to a controlled terminal of the first switching circuit in a determination that the series branch circuit is in the light load working condition according to the output voltage of the series branch circuit.

In an embodiment, the second sampling identification module includes: a second voltage sampling circuit, a second comparison circuit, and a second switching circuit;

a sampling terminal of the second voltage sampling circuit is connected to a cathode of a last mini-LED in the series branch circuit, and the second voltage sampling circuit is configured to sample the output voltage of the series branch circuit and output a second voltage sampling signal;

a first input terminal of the second comparison circuit is connected to the output terminal of the second voltage sampling circuit, a second input terminal of the second comparison circuit is configured to access a second preset reference voltage, and the second comparison circuit is configured to output the first switch control signal in a determination that the series branch circuit is in the heavy load working condition according to the second voltage sampling signal and the reference voltage, and output the second switch control signal in a determination that the series branch circuit is in the light load working condition;

a first input terminal, a second input terminal, a first output terminal and a second output terminal of the second switching circuit are a first input terminal, a second input terminal, a first output terminal and a second output terminal of the second sampling identification module respectively, the controlled terminal of the second switching circuit is connected to an output terminal of the second comparison circuit, and the second switching circuit is configured to output the accessed PWM signal from the first output terminal in response that the first switch control signal is received, and output the accessed PFM signal from the first output terminal in response that the second switch control signal is received.

In an embodiment, the second switching circuit includes: a second N-type thin film transistor and a second P-type thin film transistor;

a controlled terminal of the second N-type thin film transistor and a controlled terminal of the second P-type thin film transistor are interconnected to form a controlled terminal of the second switching circuit;

an input terminal of the second P-type thin film transistor is the first input terminal of the second switching circuit; an output terminal of the second P-type thin film transistor is the first output terminal of the second switching circuit;

an input terminal of the second N-type thin film transistor is the second input terminal of the second switching circuit; an output terminal of the second N-type thin film transistor is the second output terminal of the second switching circuit.

The present application further provides a display panel, including:

a series branch circuit including a plurality of mini-LEDs disposed in series groups;

a charge pump module configured with a first switching circuit; and the charge pump control circuit as mentioned above;

in particular an output terminal of the charge pump module is connected to an input terminal of the series branch circuit, and the first switching circuit is configured to adjust an output voltage of the charge pump module; and the charge pump control circuit is connected to the series branch circuit and the first switching circuit.

The present application further provides a display device, including the display panel as mentioned above.

The technical scheme of the present application adopts the first sampling identification module, the PWM module and the PFM module, so that the first sampling identification module is configured to sample the input voltage of the series branch circuit to generate the corresponding voltage sampling signal, and output the first switching signal to control the PWM module to output the PWM signal in a determination that the series branch circuit is in a heavy load working condition according to the voltage sampling signal, to drive the first switching circuit to work; and output the second switching signal to control the PFM module to output the PFM signal in a determination that the series branch circuit is in the light load working condition according to the voltage sampling signal, to drive the first switching circuit to work. The charge pump control circuit of the present application integrates the PWM control function and the PFM control function, so that when the display device continuously plays the pictures, the PWM module or the PFM module can be switched at any time according to the heavy load and light load working conditions of the series branch circuit, to perform PFM control on the first switching circuit in the light load working condition. The first switching circuit does not need to work under PWM control for a long time, to reduce the conduction loss of the first switching circuit, and reduce the working power consumption of the charge pump module, to solve the problem of high power consumption of the mini-LED display panel.

BRIEF DESCRIPTION OF THE DRAWINGS

In order to more clearly illustrate the technical solutions in the embodiments of the present application or in the prior art, the following will briefly introduce the drawings in the description of the embodiments or the related art. Obviously, the drawings in the following description are only some embodiments of the present application. For those of ordinary skill in the art, other drawings can also be obtained according to the structure shown in these drawings, without paying any creative labor.

The realization, functional features and advantages of the purpose of the present application will be further described with reference to the attached drawings in combination with the embodiments.

DETAILED DESCRIPTION OF THE EMBODIMENTS

The technical solutions in the embodiments of the present application will be clearly and completely described in conjunction with the accompanying drawings in the embodiments of the present application. Obviously, the described embodiments are only a part of the embodiments of the present application, not all of the embodiments. Based on the embodiments in the present application, all other embodiments obtained by those skilled in the art without creative labor fall within the scope of protection of the present application.

In addition, the descriptions associated with, e.g., "first" and "second", etc. in the present application are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions of the various embodiments can be combined with each other, but they must be based on the realization of those skilled in the art. When the combination of technical solutions is contradictory or cannot be achieved, it should be considered that such a combination of technical solutions does not exist, nor is it within the scope of the present application.

The present application provides a charge pump control circuit, which can be applied to a mini-LED display panel.

The display panel may include a series branch circuit 60 and a charge pump module 70. The series branch circuit 60 is composed of a plurality of mini-LEDs in series. The charge pump module 70 has a first switching circuit 71. An output terminal of the charge pump module 70 is connected to an input terminal of the series branch circuit 60, and the first switching circuit 71 is configured to adjust an input voltage output from the charge pump module 70 to the series branch circuit 60. It should be noted that since the series branch circuit 60 adopts multi-mini-LEDs in series, the input voltage flowing through each mini-LED is the same, and a terminal voltage at both terminals of each mini-LED decreases step by step along a transmission direction of the input voltage, an anode voltage of the first mini-LED in the series branch circuit 60, that is, the input voltage of the series branch circuit 60, that is, the output voltage of the charge pump module 70, is higher, the power consumption of the charge pump module 70 is thus higher, and then the power consumption of the display panel is higher.

Figure 1:
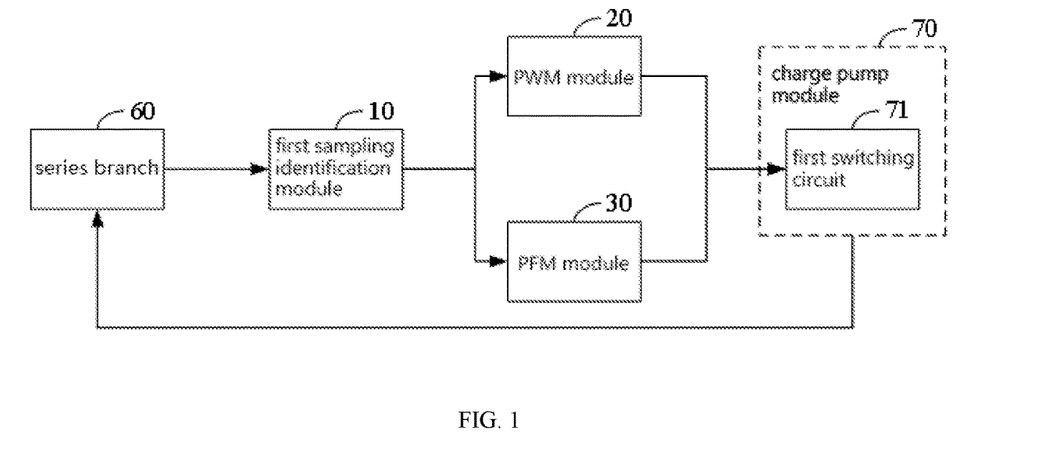
FIG. 1 is a module diagram of a charge pump control circuit according to an embodiment of the present application.

For the above problems, as shown in FIG. 1, in some embodiments, the charge pump control circuit includes: a first sampling identification module 10, a PWM module 20 and a PFM module 30;

a sampling terminal of the first sampling identification module 10 is connected to the series branch circuit 60, and the first sampling identification module 10 is configured to sample an input voltage of the series branch circuit 60, and output the first switching signal in a determination that the series branch circuit 60 is in a heavy load working condition according to the input voltage of the series branch circuit 60; and output the second switching signal, in a determination that the series branch circuit 60 is in a light load working condition according to the input voltage of the series branch circuit 60;

a controlled terminal of the PWM module 20 is connected to an output terminal of the first sampling identification module 10, an output terminal of the PWM module 20 is connected to a controlled terminal of the first switching circuit 71, and the PWM module 20 is configured to output a PWM signal to drive the first switching circuit 71 in response that the first switching signal is received; and, a controlled terminal of the PFM module 30 is connected to an output terminal of the first sampling identification module 10, the output terminal of the PFM module 30 is connected to the controlled terminal of the first switching circuit 71, and the PFM module 30 is configured to output a PFM signal to drive the first switching circuit 71 to operate in response that the second switching signal is received.

In the embodiment, a sampling terminal of the first sampling identification module 10 may be connected to the input terminal of the series branch circuit 60 or the output terminal of the charge pump circuit. Due to the different backlight brightness required for the current pictures, working conditions of each mini-LED can be divided into the heavy load working condition and the light load working condition. When each mini-LED is in heavy load working condition, the input voltage in the series branch circuit 60 will increase compared with the normal display screen. When each mini-LED is in heavy load working condition, the input voltage in the series branch circuit 60 will decrease compared with the normal display screen, therefore, the first sampling identification module 10 can generate a corresponding first voltage sampling signal FB1 according to the sampling result of the input voltage, and determine the current working condition of the series branch circuit 60. The first sampling identification module 10 can run a corresponding hardware circuit or software program or algorithm to compare the first voltage sampling signal FB1 with a first preset voltage threshold/first preset reference voltage Vref1 in real time, and when the comparison result is that the first voltage sampling signal FB1 is greater than the first preset voltage threshold/first preset reference voltage Vref1, a second switching signal is output in a determination that the series branch circuit 60 is in the heavy load working condition; when the comparison result is that the first voltage sampling signal FB1 is less than the first preset voltage threshold/the first preset reference voltage Vref1, the second switching signal is output in a determination that the series branch circuit 60 is in the light load working condition. In particular, the first preset voltage threshold/the first preset reference voltage Vref1 may correspond to the input voltage when a picture is displayed normally, a first switching signal and a second switching signal may be level signals, one of the two may be a high level signal, and the other may be a low level signal.

The PWM (Pulse Width Modulation) module may be configured to operate when the controlled terminal receives the first switching signal, and generate a PWM signal with a fixed frequency and an adjustable duty cycle during operation, and not operate when the second switching signal is received. The PWM module 20 can further communicate with a timing controller in the display device to access a duty cycle configuration signal, which is output by the timing controller according to the current display screen during operation, and can determine a duty cycle parameter of the PWM signal according to the duty cycle configuration signal, and control the integrated PWM signal generation unit to output the PWM signal with the corresponding duty cycle parameter to the controlled terminal of the first switching circuit 71, so that the first switching circuit 71 can correspondingly adjust the output voltage of the charge pump module 70, so that the output voltage of the charge pump module 70 can meet requirements of the series branch circuit 60 in the heavy load working condition.

PFM (Pulse Frequency Modulation) may be configured to operate when its controlled terminal receives the second switching signal, and generate a PFM signal with a fixed duty cycle and an adjustable frequency during operation, and not operate when the first switching signal is received. A preset frequency parameter may be pre-stored in the PFM module 30 to control the integrated PFM signal generation unit to output a PFM signal with a corresponding frequency parameter to the controlled terminal of the first switching circuit 71 according to the preset frequency parameter during operation, so that the first switching circuit 71 can adjust the output voltage of the charge pump module 70 correspondingly, so that the output voltage of the charge pump module 70 can meet the requirements of the light load working condition of the series branch circuit 60. Of course, the PFM module 30 may further communicate with the timing controller in the display device during operation to access the frequency configuration signal output, which is output by the timing controller according to the current display screen, and configure the frequency parameters of the PFM signal in real time according to the frequency configuration signal.

In this way, when the display device continuously plays the pictures, the first sampling identification module 10 can switch the PWM module 20 or the PFM module 30 to work at any time according to the heavy load and light load working conditions of the series branch circuit 60, and perform PFM control on the first switching circuit 71 in the light load working condition, so that the first switching circuit 71 does not need to work under PWM control for a long time, to reduce conduction loss of the first switching circuit 71, and reduce the operating power consumption of the charge pump module 70, and to solve the problem of high power consumption of the mini-LED display panel.

Figure 2:
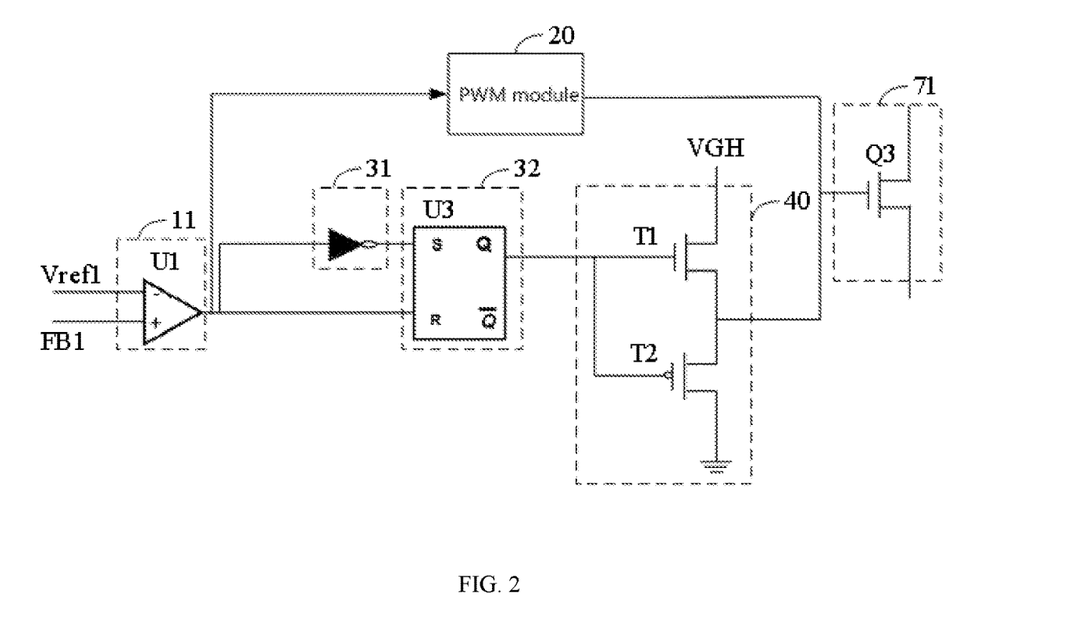
FIG. 2 is a circuit diagram of the charge pump control circuit according to the embodiment of the present application.
Figure 3:
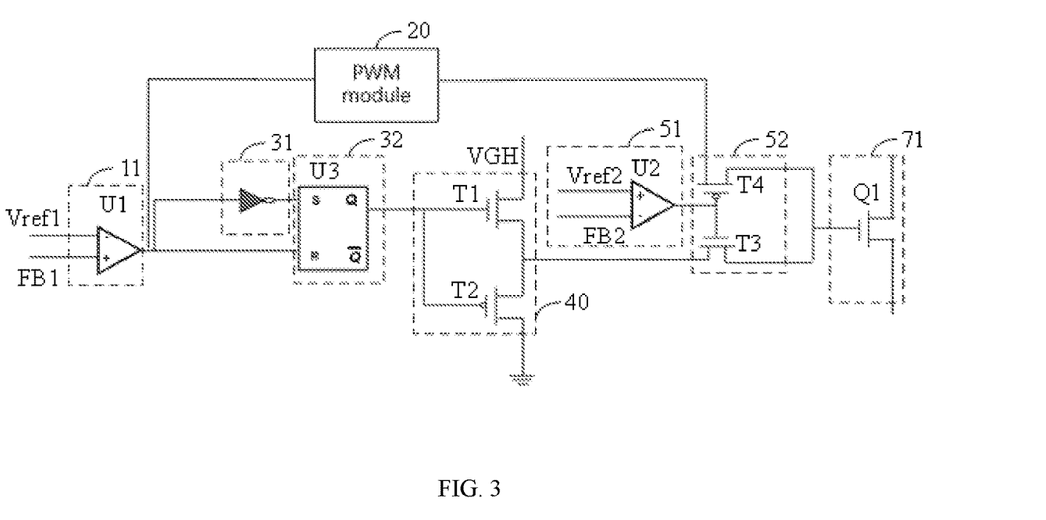
FIG. 3 is a circuit diagram of the charge pump control circuit according to another embodiment of the present application.

As shown in FIGS. 2 and 3, in some embodiments, the first sampling identification module 10 further includes:
- a first voltage sampling circuit, a sampling terminal of the first voltage sampling circuit is connected to the anode of the first mini-LED in the series branch circuit 60, and the first voltage sampling circuit is configured to sample the input voltage of the series branch circuit 60 and output the first voltage sampling signal FB1;
- a first input terminal of the first comparison circuit 11 is connected to an output terminal of the first voltage sampling circuit, a second input terminal of the first comparison circuit 11 is configured to access a first preset first reference voltage Vref1, and output the first switching signal or the second switching signal according to a comparison result of the first voltage sampling signal FB1 and the first reference voltage Vref1.

The first voltage sampling circuit may be implemented by a shunt circuit or a voltage divider circuit composed of resistors, or a dedicated voltage detection element, which is not limited here. The first voltage sampling circuit may sample an anode voltage of the first mini-LED in the series branch circuit 60 by using a principle of voltage division or current division of the resistors, and output a first voltage detection signal in the form of voltage or current.

A comparison circuit 12 may be composed of an operational amplifier, or implemented by a dedicated comparison chip. The comparison circuit 12 can compare the first voltage sampling signal FB1 connected to the first input terminal with the first preset reference voltage Vref1 connected to the second input terminal in real time. When the comparison result is that the first voltage sampling signal FB1 is greater than the first reference voltage Vref1, the first switching signal is output in a determination that the series branch circuit 60 is in the heavy load working condition. When the comparison result is that the first voltage sampling signal FB1 is less than the first reference voltage Vref1, a second switching signal is output in a determination that the series branch circuit 60 is in the light load working condition. When the comparison result is that the first voltage sampling signal FB1 is equal to the first reference voltage Vref1, the comparison circuit 12 maintains the first switching signal or the second switching signal currently outputted.

As shown in FIGS. 2 and 3, the first comparison circuit 11 includes: a first operational amplifier U1, a non-inverting input terminal of the first operational amplifier U1 is configured to access the first voltage sampling signal FB1, and an inverting input terminal of the first operational amplifier U1 is configured to access the first reference voltage Vref1. The output terminal of the first operational amplifier U1 is respectively connected to the controlled terminal of the PWM module 20 and the controlled terminal of the PFM module 30. In other words, the first switching signal is a high level signal, and the second switching signal is a low level signal. In the embodiment, the comparison circuit 12 is implemented by adopting a pure hardware circuit, which can avoid a situation that the software runs and affects the comparison result, which is beneficial to improve the stability of the control, and the hardware circuit has a faster response rate, which is more suitable for the control requirement of high refresh rate.

As shown in FIGS. 2 and 3, in some embodiments, the PFM module 30 includes: an inverting module 31 and a trigger module 32, an input terminal of the inverting module 31 is connected to an output terminal of the first sampling identification module 10, and the inverting module is configured to invert the second switching signal and output the second switching signal after inverting;
- a first input terminal of the trigger module 32 is connected to an output terminal of the inverting module 31, a second input terminal of the trigger module 32 is connected to the output terminal of the first sampling identification module 10, an output terminal of the trigger module 32 is the output terminal of the PFM module 30, and the trigger module 32 is configured to generate and output a corresponding PFM signal according to the inverted second switching signal received at the first input terminal in response that the second switching signal is received at the second input terminal.

In the embodiment, the inverting module 31 may be implemented by using at least one inverter. When receiving a high-level signal "1", the inverting module 31 inverts the high-level signal into a low-level signal "0" and outputs the low-level signal. When receiving a low-level signal "0", the inverting module 31 inverts the low-level signal into a high-level signal "1" and outputs the high-level signal.

The first input terminal of the trigger module 32 is interconnected with the input terminal of the inverting module 31 to form a controlled terminal of the PFM module 30. In this way, when the second switching signal is input to the inverting module 31, the level signals received by the first input terminal and the second input terminal of the trigger module 32 are opposite, and the trigger module 32 can output a PFM signal of the same level as the level signal received by the first input terminal. As shown in FIGS. 2 and 3, the trigger module 32 is implemented by using an RS trigger U3, and the RS trigger U3 may have a CLK input terminal, an S input terminal, an R input terminal, a Q output terminal and a Q non-output terminal. The S input terminal may be a first input terminal of the trigger module 32, the R input terminal may be a second input terminal of the trigger module 32, and the Q output terminal may be an output terminal of the trigger module. In this way, when the input terminal of the inverting module 31 receives the second switching signal, the R input terminal of the RS trigger U3 is set to "0", the S input terminal is set to "1", and the Q output terminal outputs a high-level signal "1". When the input terminal of the inverting module 31 receives the first switching signal, the R input terminal of the RS trigger U3 is set to "1" and the S input terminal is set to "0", the Q output outputs a low-level signal "0.

As shown in FIGS. 2 and 3, in some embodiments, the charge pump control circuit further includes: an amplifying module 40; a controlled terminal of the amplifying module 40 is connected to the output terminal of the PFM module 30, an input terminal of the amplifying module 40 is configured to access a gate turn-on voltage, an output terminal of the amplifying module 40 is connected to a controlled terminal of the first switching circuit 71, and the amplifying module 40 is configured to amplify a signal amplitude of the PFM signal according to the gate turn-on voltage and output to the controlled terminal of the first switching circuit 71.

Since an amplitude of the output voltage of the trigger module 32 is lower, driving capability of the first switching circuit 71 is weaker. In view of this problem, the technical solution of the present application further provides an amplifying module 40, the amplifying module 40 can be implemented by an amplifying circuit composed of switching elements, and the input terminal of the amplifying module 40 can be connected to a gate turn-on/turn-off voltage output terminal of the power management circuit in the display device. When receiving the PFM signal, the amplifying module 40 may control the corresponding switching element to be turned-on or turned-off according to the PFM signal, so that the turned-on switching element can be connected to the gate turn-on voltage and output to the controlled terminal of the first switching circuit 71 as a high level signal in the amplified PWM signal, to amplify the signal amplitude of the PFM signal. This arrangement is beneficial to enhance the driving capability of the PFM signal to the first switching circuit 71. It should be noted that since the gate turn-on voltage VGH can usually be as high as 30V, the gate turn-on voltage VGH can fully meet the driving requirements for the first switching circuit 71, and the technical solution of the present application does not need to set a dedicated voltage generation circuit, which can reduce charge pump of the present application. The occupied area of the control circuit on the circuit board is beneficial to the narrow frame design of the display device. In addition, through the high voltage value of the gate turn-on voltage VGH, it is also beneficial to further reduce conduction loss of the first switching circuit 71.

In some embodiments, the amplifying module 40 includes: a first N-type thin film transistor T1 and a first P-type thin film transistor T2.

An input terminal of the first N-type thin film transistor T1 is the input terminal of the amplifying module 40. A controlled terminal of the first N-type thin film transistor T1 and the controlled terminal of the first P-type thin film transistor T2 are interconnected to form the controlled terminal of the amplifying module 40. An output terminal of the first N-type thin film transistor T1 and the input terminal of the first P-type T2 thin film transistor are interconnected to form the output terminal of the amplifying module 40, an output terminal of the first P-type T2 thin film transistor is grounded.

In the embodiment, the first N-type thin film transistor T1 and the first P-type thin film transistor T2 form a push-pull amplifier circuit. In this way, when the trigger module 32 outputs a high-level signal, the first N-type thin film transistor T1 is turned on, and the first P-type thin film transistor T2 is turned off, so that the gate turn-on signal is input and output as an amplified PFM signal. When the trigger module 32 outputs a low-level signal, the first N-type thin film transistor T1 is turned off, and the first P-type thin film transistor T2 is turned on, and the amplifying module 40 outputs a low-level signal. This arrangement enables the amplifying module 40 to amplify the signal amplitude of the high level signal in the PFM signal only by using the gate turn-on voltage without affecting the frequency and period of the PFM signal. In addition, since the first N-type thin film transistor T1 and the first P-type thin film transistor T2 are turned on only one at a time, the conduction loss is small and the efficiency is high, so that driving ability and a switching speed of the first switching circuit 71 can be improved and the loss can be reduced.

As shown in FIG. 3, in some embodiment, the charge pump control circuit further includes: a second sampling identification module 50, a first input terminal of the second sampling identification module 50 is connected to the output terminal of the PWM module 20, a second input terminal of the second sampling identification module 50 is connected to an output terminal of the PFM module 30, and a sampling terminal of the second sampling identification module 50 is connected to the series branch circuit 60, a first output terminal and a second output terminal of the second sampling identification module 50 are connected to the controlled terminal of the first switching circuit 71. The second sampling identification module 50 is configured to sample the output voltage of the series branch circuit, and output the accessed PWM signal from the first output terminal to the controlled terminal of the first switching circuit 71 in a determination that the series branch circuit 60 is in the heavy load working condition according to the output voltage of the series branch circuit 60, and output the accessed PFM signal from the second output terminal to a controlled terminal of the first switching circuit 71 in a determination that the series branch circuit is in the light load working condition according to the output voltage of the series branch circuit 60.

Since a single input voltage cannot accurately represent the load working condition of the series branch circuit 60, for example, there is a case where the series branch circuit 60 is in the heavy load working condition, but the input voltage is smaller, or there is a case where the series branch circuit 60 is in the light load working condition, but the input voltage is larger. To solve this problem, a second sampling identification module is provided in the present application, that is, a second sampling identification module 50. The sampling terminal of the second sampling identification module 50 may be connected to the output terminal of the series branch circuit 60, to sample the output voltage of the series branch circuit 60. It can be understood that when the series branch circuit 60 is in the heavy load working condition, the output voltage is larger than an output voltage of the normal display screen; when the series branch circuit 60 is in the light load working condition, the output voltage is smaller than the output voltage of the normal display screen, so that the second sampling identification module 50 can generate the corresponding second voltage sampling signal FB2 according to the sampling result of the output voltage, and determine the current working condition of the series branch circuit 60.

The second sampling identification module 50 may run a corresponding hardware circuit or software program or algorithm to compare the second voltage sampling signal FB2 with the second preset voltage threshold/second preset reference voltage Vref2. When the comparison result is that the second voltage sampling signal FB2 is greater than the second preset voltage threshold/the first preset reference voltage Vref1, it can be determined that the series branch circuit 60 is in the heavy load working condition, and the second sampling identification module 50 can output the PWM signal output by the PWM module 20 to the first switching circuit 71, to realize PWM control of the first switching circuit 71. In this way, when the series branch circuit 60 is in the heavy load working condition and the input voltage is smaller, the PWM module 20 can normally perform PWM control of the first switch control circuit, to meet requirements of the series branch circuit 60 in the heavy load working condition. When the comparison result is that the second voltage sampling signal FB2 is less than the second preset voltage threshold/the second reference voltage Vref1, it can be determined that the series branch circuit 60 is in the light load working condition, and the second sampling identification module 50 can output the PFM signal output by the PFM module 30 to the first switching circuit 71, to realize the PFM control of the first switching circuit 71. In this way, when the series branch circuit 60 is in the light load working condition and the input voltage is larger, the PFM module 30 can normally perform the first switch control circuit PFM control, to meet the requirements of the series branch circuit 60 in the light load working condition. The second preset voltage threshold/the second preset reference voltage Vref2 can correspond to the output voltage when the pictures is normally displayed. This arrangement makes a control of the first switching circuit in the present application more in compliance with the load working condition of the series branch circuit 60, which is beneficial to improve stability of the control.

As shown in FIG. 3, in some embodiment, the second sampling identification module 50 includes: a second voltage sampling circuit 51 and a second comparison circuit 52;

a sampling terminal of the second voltage sampling circuit 51 is connected to a cathode of a last mini-LED in the series branch circuit 60, and the second voltage sampling circuit 51 is configured to sample the output voltage of the series branch circuit 60 and output a second voltage sampling signal FB2;

a first input terminal of the second comparison circuit 52 is connected to the output terminal of the voltage sampling circuit, a second input terminal of the second comparison circuit 52 is configured to access the second preset reference voltage Vref2, and the second comparison circuit 52 is configured to determine that the series branch circuit 60 is in the heavy load working condition according to the second voltage sampling signal FB2 and the reference voltage, and output the first switch control signal; when the series branch circuit 60 is in a light load working condition, a second switch control signal is output.

A second switching circuit 53, a first input terminal, a second input terminal, a first output terminal and a second output terminal of the second switching circuit 53 are respectively the first input terminal, the second input terminal, the first output terminal and the second output terminal of the second sampling identification module 50. A controlled terminal of the second switching circuit 53 is connected to the output terminal of the second comparison circuit 52, and the second switching circuit 53 is configured to receive the first switch control signal. The PWM signal to be accessed is output from a first output terminal. When the second switch control signal is received, the PFM signal to be accessed is output from the first output terminal.

The implementation of the second voltage sampling circuit 51 may refer to the first voltage sampling circuit, which will not be repeated here. The second voltage sampling circuit 51 may sample the anode voltage of the last mini-LED in the series branch circuit 60 by using the principle of resistor voltage division or resistor shunt, and output the second voltage detection signal in the form of voltage or current.

The implementation of the second comparison circuit 52 may refer to the first comparison circuit 11, which will not be repeated here. The second comparison circuit 52 can compare the second voltage sampling signal FB2 connected to the first input terminal and the second input terminal respectively with the second preset reference voltage Vref2 in real time. When a comparison result is that the second voltage sampling signal FB2 is greater than the second reference voltage Vref1, it is determined that the series branch circuit 60 is under heavy load working condition and outputs the first switch control signal. When the comparison result is that the first voltage sampling signal FB1 is less than the first reference voltage Vref1, it is determined that the series branch circuit 60 is in a light load working condition, and the second switch control signal is output. It should be noted that, when the comparison result is that the second voltage sampling signal FB2 is equal to the second reference voltage Vref1, the second comparison circuit 52 maintains the first switch control signal or the second switch control signal currently outputted. One of the first switch control signal and the second switch control signal may be a high level signal and the other may be a low level signal. As shown in FIG. 3, the second comparison circuit 52 includes: a second operational amplifier U2 having an inverting input terminal for accessing the second voltage sampling signal FB2 and a non-inverting input terminal for accessing the second preset reference voltage Vref2. In other words, the first switch control signal is a low-level signal, and the second switch signal is a high-level signal. In this embodiment, the comparison circuit 12 is implemented by adopting a purely hardware circuit, which is beneficial to improving stability of control and adaptability to a high refresh rate.

The second switching circuit 53 may be implemented by a plurality of switching elements. When the second switching circuit 53 receives the first switch control signal, it controls the on/off of the corresponding switching element in itself, so that the first input terminal and the first output terminal are connected, and the second input terminal and the second output terminal are connected and disconnected, thereby realizing the PWM signal access and output. When the second switch control signal is received, by controlling the on/off of the corresponding switching element in itself, a connection between the first input terminal and the first output terminal is disconnected, and the second input terminal and the second output terminal are connected, so that the PWM signal is connected and output.

In some embodiment, the second switching circuit 53 includes a second N-type thin film transistor T3 and a second P-type thin film transistor T4.

The controlled terminal of the second N-type thin film transistor T3 and the controlled terminal of the second P-type thin film transistor T4 are interconnected to form the controlled terminal of the second switching circuit 53. The input terminal of the second P-type thin film transistor T4 is the first input terminal of the second switching circuit 53. The output terminal of the second P-type thin film transistor T4 is the first output terminal of the second switching circuit 53. An input terminal of the second N-type thin film transistor T3 is a second input terminal of the second switching circuit 53. And an output terminal of the second N-type thin film transistor T3 is a second output terminal of the second switching circuit 53.

When the controlled terminal of the second switching circuit 53 receives the first switch control signal of the low-level signal, the second P-type thin film transistor T4 is turned on, and the second N-type thin film transistor T3 is turned off, so that the second input terminal and the second output terminal of the second switching circuit 53 are connected and disconnected while the first input terminal and the first output terminal are connected; when the controlled terminal of the second switching circuit 53 receives the second switch control signal of the high level signal, the second P-type thin film transistor T4 is turned off, and the second N-type thin film transistor T3 is turned on, so that the second input terminal and the second output terminal of the second switching circuit 53 are connected and disconnected from the first input terminal and the first output terminal.

Figure 4:
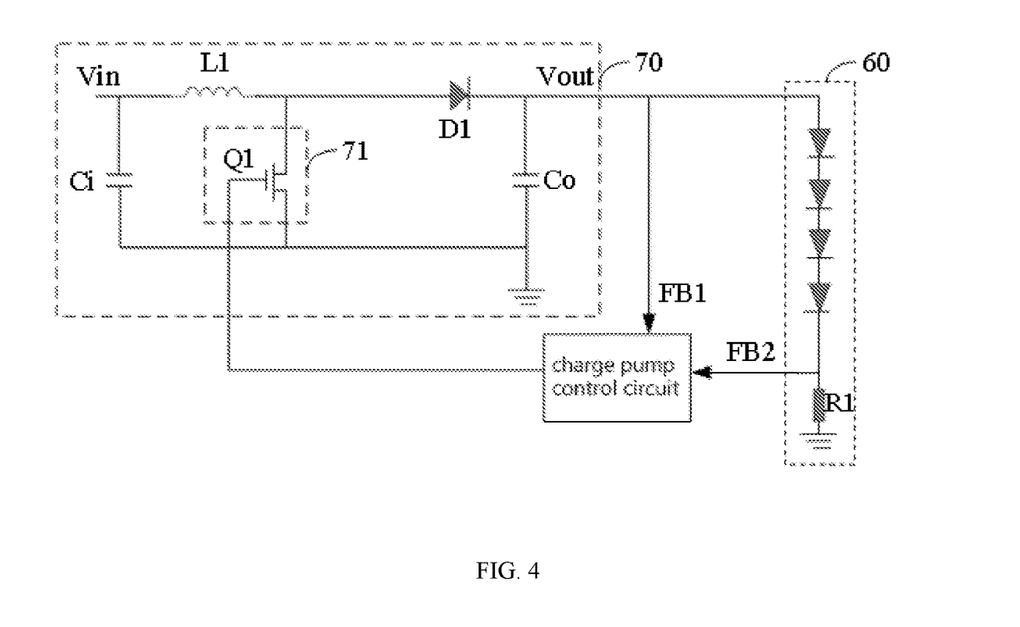
FIG. 4 is a schematic circuit diagram of a display panel according to an embodiment of the present application.

As shown in FIG. 4, the present application further provides a display panel, which includes a series branch circuit 60, a charge pump module 70 and a charge pump control circuit. For a specific structure of the charge pump control circuit, reference is made to the above embodiments. Since the display panel adopts all the technical solutions of the above embodiments, at least all beneficial effects brought by the technical solutions of the above embodiments are provided, and details are not described here.

The series branch circuit 60 may include a plurality of mini-LEDs arranged in series, and the number of mini-LEDs is determined by actual needs, which is not limited here. The charge pump module 70 has a first switching circuit 71. An output terminal of the charge pump module 70 is connected to an input terminal of the series branch circuit 60, and the first switching circuit 71 is configured to adjust an output voltage output from the charge pump module 70 to the series branch circuit 60 when operating. The charge pump control circuit is connected to the series branch circuit 60 and the first switching circuit 71, respectively.

As shown in FIG. 5, the first switching circuit 71 includes a third switching element Q1, and the charge pump module 70 further includes an input capacitor Ci, a first inductor L1, a first diode D1 and an output capacitor Co. A first terminal of the input capacitor Ci is connected to a first terminal of the first inductor L1 and is an input terminal of the charge pump circuit for accessing the input voltage. A second terminal of the first inductor L1 is respectively connected to the input terminal of the third switching element Q1 and an anode of the first diode D1. A cathode of the first diode D1 is connected to the first terminal of the output capacitor Co, and is the output terminal of the charge pump circuit for outputting the output voltage to the series branch circuit 60. A second terminal of the input capacitor Ci, the output terminal of the third switching element Q1 and the second terminal of the output capacitor Co are connected and grounded. The third switching element Q1 is configured to control charge and discharge states of the input capacitor Ci, the first inductor L1, and the output capacitor Co under the control of the charge pump control circuit, thereby the input voltage is boosted or stepped down and then output to the series branch circuit 60 as an output voltage. In this embodiment, the series branch circuit 60 further includes a first resistor R1, and the first resistor R1 may be connected between the cathode of the last mini-LED and ground.

The present application also provides a display device including a display panel. A specific structure of the display panel refers to the above embodiments. Since the display device adopts all the technical solutions of the above embodiments, it has at least all the beneficial effects brought by the technical solutions of the above embodiments, which will not be repeated here.

The above is only an optional embodiment of the present application, and does not limit the patent scope of the present application. Any equivalent structural transformation made under the application concept of the present application by using the description and drawings of the present application, or directly/indirectly applied in other related technical fields, is included in the patent protection scope of the present application.

What is claimed is:

1. A charge pump control circuit, applied to a display panel, wherein the display panel comprises a series branch circuit and a charge pump module, the series branch circuit comprises a plurality of mini-light emitting diodes (mini-LEDs) disposed in series groups, the charge pump module is provided with a first switching circuit, an output terminal of the charge pump module is connected to an input terminal of the series branch circuit, and the first switching circuit is configured to adjust an output voltage of the charge pump module;

wherein the charge pump control circuit comprises:
a first sampling identification module, a pulse width modulation (PWM) module, and a pulse frequency modulation (PFM) module;
wherein a sampling terminal of the first sampling identification module is connected to the series branch circuit, the first sampling identification module is configured to sample an input voltage of the series branch circuit, and output a first switching signal in a determination that the series branch circuit is in a heavy load working condition according to the input voltage of the series branch circuit, and output a second switching signal in a determination that the series branch circuit is in a light load working condition according to the input voltage of the series branch circuit;

a controlled terminal of the PWM module is connected to an output terminal of the first sampling identification module, an output terminal of the PWM module is connected to a controlled terminal of the first switching circuit, and the PWM module is configured to output a PWM signal to drive the first switching circuit in response that the first switching signal is received; and a controlled terminal of the PFM module is connected to an output terminal of the first sampling identification module, an output terminal of the PFM module is connected to the controlled terminal of the first switching circuit, and the PFM module is configured to output a PFM signal to drive the first switching circuit to operate in response that the second switching signal is received.

2. The charge pump control circuit of claim 1, wherein the first sampling identification module comprises: a first voltage sampling circuit and a first comparison circuit;

wherein a sampling terminal of the first voltage sampling circuit is connected to an anode of a first mini-LED in the series branch circuit, and the first voltage sampling circuit is configured to sample the input voltage of the series branch circuit and output the first voltage sampling signal;

a first input terminal of the first comparison circuit is connected to an output terminal of the first voltage sampling circuit, a second input terminal of the first comparison circuit is configured to access a first preset reference voltage, and output the first switching signal or the second switching signal according to a comparison result of the first voltage sampling signal and the first preset reference voltage.

3. The charge pump control circuit of claim 1, wherein the PFM module comprises: an inverting module and a trigger module;

wherein an input terminal of the inverting module is connected to an output terminal of the first sampling identification module, and the inverting module is configured to invert the second switching signal and output the inverted second switching signal;

a first input terminal of the trigger module is connected to an output terminal of the inverting module, a second input terminal of the trigger module is connected to the output terminal of the first sampling identification module, an output terminal of the trigger module is the output terminal of the PFM module, and the trigger module is configured to generate and output a corresponding PFM signal according to the inverted second switching signal received at the first input terminal in response that the second switching signal is received at the second input terminal.

4. The charge pump control circuit of claim 3, wherein the charge pump control circuit further comprises: an amplifying module;

wherein a controlled terminal of the amplifying module is connected to the output terminal of the PFM module, an input terminal of the amplifying module is configured to access a gate turn-on voltage, an output terminal of the amplifying module is connected to a controlled terminal of the first switching circuit, and the amplifying module is configured to amplify a signal amplitude of the PFM signal according to the gate turn-on voltage and output to the controlled terminal of the first switching circuit.

5. The charge pump control circuit of claim 4, wherein the amplifying module comprises:

a first N-type thin film transistor, and a first P-type thin film transistor;

wherein an input terminal of the first N-type thin film transistor is the input terminal of the amplifying module, a controlled terminal of the first N-type thin film transistor and a controlled terminal of the first P-type thin film transistor are interconnected to form the controlled terminal of the amplifying module, an output terminal of the first N-type thin film transistor and the input terminal of the first P-type thin film transistor are interconnected to form the output terminal of the amplifying module, an output terminal of the first P-type thin film transistor is grounded.

6. The charge pump control circuit of claim 1, wherein the charge pump control circuit further comprises: a second sampling identification module;

wherein a first input terminal of the second sampling identification module is connected to the output terminal of the PWM module, a second input terminal of the second sampling identification module is connected to the output terminal of the PFM module, a sampling terminal of the second sampling identification module is connected to the series branch circuit, a first output terminal and a second output terminal of the second sampling identification module are connected to the controlled terminal of the first switching circuit;

the second sampling identification module is configured to sample the output voltage of the series branch circuit, and output the accessed PWM signal from the first output terminal to the controlled terminal of the first switching circuit in a determination that the series branch circuit is in the heavy load working condition according to the output voltage of the series branch circuit, and output the accessed PFM signal from the second output terminal to a controlled terminal of the first switching circuit in a determination that the series branch circuit is in the light load working condition according to the output voltage of the series branch circuit.

7. The charge pump control circuit of claim 6, wherein the second sampling identification module comprises: a second voltage sampling circuit, a second comparison circuit, and a second switching circuit;

wherein a sampling terminal of the second voltage sampling circuit is connected to a cathode of a last mini-LED in the series branch circuit, and the second voltage sampling circuit is configured to sample the output voltage of the series branch circuit and output a second voltage sampling signal;

a first input terminal of the second comparison circuit is connected to the output terminal of the second voltage sampling circuit, a second input terminal of the second comparison circuit is configured to access a second preset reference voltage, and the second comparison circuit is configured to output the first switch control signal in a determination that the series branch circuit is in the heavy load working condition according to the second voltage sampling signal and the reference voltage, and output the second switch control signal in a determination that the series branch circuit is in the light load working condition;

a first input terminal, a second input terminal, a first output terminal and a second output terminal of the second switching circuit are a first input terminal, a second input terminal, a first output terminal and a second output terminal of the second sampling identification module respectively, the controlled terminal of the second switching circuit is connected to an output terminal of the second comparison circuit, and the second switching circuit is configured to output the accessed PWM signal from the first output terminal in response that the first switch control signal is received, and output the accessed PFM signal from the first output terminal in response that the second switch control signal is received.

8. The charge pump control circuit of claim 7, wherein the second switching circuit comprises: a second N-type thin film transistor and a second P-type thin film transistor;
wherein a controlled terminal of the second N-type thin film transistor and a controlled terminal of the second P-type thin film transistor are interconnected to form a controlled terminal of the second switching circuit;
an input terminal of the second P-type thin film transistor is the first input terminal of the second switching circuit; an output terminal of the second P-type thin film transistor is the first output terminal of the second switching circuit;
an input terminal of the second N-type thin film transistor is the second input terminal of the second switching circuit; an output terminal of the second N-type thin film transistor is the second output terminal of the second switching circuit.

9. A display panel, comprising:
a series branch circuit comprising a plurality of mini-LEDs disposed in series groups;
a charge pump module configured with a first switching circuit; and
the charge pump control circuit of claim 1;
wherein an output terminal of the charge pump module is connected to an input terminal of the series branch circuit, and the first switching circuit is configured to adjust an output voltage of the charge pump module; and
the charge pump control circuit is connected to the series branch circuit and the first switching circuit.

10. A display device, comprising a display panel;
wherein, the display panel comprises:
a series branch circuit comprising a plurality of mini-light emitting diodes (mini-LEDs) disposed in series groups;
a charge pump module configured with a first switching circuit; and
the charge pump control circuit of claim 1;
wherein an output terminal of the charge pump module is connected to an input terminal of the series branch circuit, and the first switching circuit is configured to adjust an output voltage of the charge pump module; and
the charge pump control circuit is connected to the series branch circuit and the first switching circuit.

* * * * *